US008086898B2

(12) United States Patent
Kase

(10) Patent No.: US 8,086,898 B2
(45) Date of Patent: Dec. 27, 2011

(54) REDUNDANT I/O MODULE

(75) Inventor: Noriko Kase, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 90 days.

(21) Appl. No.: 12/692,941

(22) Filed: Jan. 25, 2010

(65) Prior Publication Data
US 2010/0191869 A1 Jul. 29, 2010

(30) Foreign Application Priority Data

Jan. 26, 2009 (JP) ................................. 2009-014207

(51) Int. Cl.
*G06F 11/00* (2006.01)
(52) U.S. Cl. ........................................................ 714/13
(58) Field of Classification Search .................. 714/2, 3, 714/4.1, 4.11, 4.12, 4.2, 4.3, 5.11, 6.3, 6.31, 714/6.32, 13, 43, 44, 56
See application file for complete search history.

(56) References Cited

U.S. PATENT DOCUMENTS

| 5,261,092 | A  | * | 11/1993 | McLaughlin et al. | ........ | 713/375 |
| 5,777,874 | A  | * | 7/1998  | Flood et al. | ...................... | 700/82 |
| 7,818,465 | B2 | * | 10/2010 | Chen et al. | ......................... | 710/8 |
| 2002/0016792 | A1 | * | 2/2002 | Ito et al. | ......................... | 707/200 |
| 2005/0010837 | A1 | * | 1/2005 | Gallagher et al. | ............ | 714/100 |
| 2006/0059389 | A1 |   | 3/2006 | Hatamori | | |
| 2006/0233204 | A1 | * | 10/2006 | Pomaranski et al. | ......... | 370/535 |
| 2008/0126579 | A1 |   | 5/2008 | Corneli et al. | | |
| 2009/0077270 | A1 | * | 3/2009 | Chen et al. | ........................ | 710/2 |

FOREIGN PATENT DOCUMENTS

JP    2001-109704 A    4/2001

OTHER PUBLICATIONS

Extended European Search Report, issued May 21, 2010 for corresponding European Patent Application No. 10151605.2.

* cited by examiner

*Primary Examiner* — Nadeem Iqbal
(74) *Attorney, Agent, or Firm* — Westerman, Hattori, Daniels & Adrian, LLP

(57) ABSTRACT

A redundant I/O module includes: a control I/O module that communicates with a controller and that comprises a first IOM setting information holding section for storing IOM setting information downloaded from a high-level apparatus, and a standby I/O module that communicates with the controller and that comprises a second IOM setting information holding section for storing IOM setting information downloaded from the high-level apparatus, wherein the controller includes: an IOM status generation section that detects a status of replacement of the standby I/O module; an IOM setting information acquisition section that makes an access to the first IOM setting information holding section of the control I/O module; an IOM setting information generation section that generates IOM setting information about the standby I/O module; and an IOM download section that downloads the generated IOM setting information into the second IOM setting information holding section of the standby I/O module.

4 Claims, 2 Drawing Sheets

REDUNDANT I/O MODULE

CROSS-REFERENCE TO RELATED APPLICATION

This application is based on and claims priority under 35 U.S.C. §119 from Japanese Patent Application No. 2009-014207 filed on Jan. 26, 2009.

BACKGROUND OF THE INVENTION

1. Technical Field

The present invention relates to a redundant I/O module comprised of a control I/O module that communicates with a controller and that has an IOM setting information holding section that stores IOM setting information downloaded from a high-level apparatus and a standby I/O module that has the IOM setting information holding section.

2. Related Art

The present invention provides a function of automatically loading IOM setting information for a replaced I/O module at the time of replacement of a redundant I/O module for interfacing between a controller of a distributed control system and plant equipment to be controlled. An IOM automatic loading function is a function of automatically loading IOM setting information required for operation of an I/O module into an I/O module by means of a controller.

FIG. 2 is a functional block diagram for describing a related-art IOM setting information downloading technique in a distributed control system. A control bus 10 is connected to a controller 20 and controls plant equipment 50 by way of a redundant control I/O module 30 or a redundant standby I/O module 40.

The control bus 10 is connected to an operation monitoring device 60 and communicates with the controller 20. An operator 70 monitors and operates the operation monitoring device 60. Further, the control bus 10 is connected to an engineering PC and communicates with the operation monitoring device 60.

The controller 20 has the IOM status generation section 21 and the IOM downloading section 22. The standby I/O module 40 has the IOM setting information holding section 41, the IOM status information holding section 42, and the IOM setting information receiving section 43. Although unillustrated, the control I/O module 30 is also configurationally identical with the standby I/O module 40 and has the IOM setting information holding section 31, the IOM status information holding section 32, and the IOM setting information receiving section 33.

The operation monitoring device 60 is equipped with a message window 61 and an IOM download window 62. An engineering PC 80 is equipped with an IOM setting information database 81 that generates, by means of engineering, IOM setting information to be downloaded and holding the thus-generated information.

In consideration of a power failure, or the like, the IOM setting information holding sections 31 and 41 of the I/O modules 30 and 40 are stored in nonvolatile memory. Therefore, when the I/O modules are replaced, the IOM setting information must be downloaded again.

FIG. 2 shows a status achieved immediately after the standby I/O module 40 has been replaced for reasons of a failure through maintenance operation. Operation performed when IOM setting information is downloaded from the engineering PC 80 into the IOM setting information holding section 41 of the standby I/O module 40 is hereinbelow described.

The IOM status generation section 21 of the controller 20 detects replacement of the standby I/O module 40 by making a reference to the IOM status holding section 42 of the standby I/O module 40 and transmits a message to the message window 61 of the operation monitoring device 60.

Glancing at a message showing replacement of the standby I/O module 40 by reference to the message window 61, the operator 70 makes a reference to IOM setting information to be downloaded from the IOM setting information database 81 of the engineering PC 80 by means of operating the IOM download window 62, and transmits the acquired IOM setting information to the IOM download section 22 of the controller 20.

The IOM download section 22 of the controller 20 transmits the received IOM setting information to the IOM setting information receiving section 43 of the standby I/O module 40. The IOM setting information receiving section 43 stores the received IOM setting information into the IOM setting information holding section 41. As a result of storage of the IOM setting information, the standby I/O module 40 starts I/O operation in accordance with new IOM setting information.

[Patent Document 1] JP-A-2001-109704

When new IOM setting information is downloaded at a plant after replacement of a broken-down I/O module, a related-art downloading technique encounters the following problems.

(1) Message check to be performed by the operator 70 and IOM loading operation are required, and replacement maintenance procedures are complicate. Further, IOM loading operation cannot be carried out without the operator.

(2) In order to acquire new IOM setting information, the engineering PC 80 must be connected to the control bus 10. An operation monitoring device and a controller which are to be operated by an operator are occasionally provided at a remote place, and many plants are not permanently equipped with an engineering PC. For this reason, an engineering PC must be carried to the remote location at the time of IOM loading operation, which poses heavy burdens on workers.

SUMMARY OF THE INVENTION

The present invention has been conceived to solve the drawbacks and aims at implementing a redundant I/O module that obviates a necessity for operator's operation and an engineering PC at the time of replacement and maintenance of a redundant I/O module and that has a function of automatically loading IOM setting information by means of a controller.

In order to accomplish the objective, the present invention is configured as follows:

(1) According to a first aspect of the invention, there is provided a redundant I/O module including:

a control I/O module that communicates with a controller and that includes a first IOM setting information holding section for storing IOM setting information downloaded from a high-level apparatus, and a standby I/O module that communicates with the controller and that includes a second IOM setting information holding section for storing IOM setting information downloaded from the high-level apparatus, wherein the controller includes:

an IOM status generation section that detects a status of replacement of the standby I/O module by reference to a status of the second IOM setting information holding section of the standby I/O module;

an IOM setting information acquisition section that makes an access to the first IOM setting information holding section of the control I/O module in accordance with status information from the IOM status generation section to acquire IOM setting information about the control I/O module;

an IOM setting information generation section that generates IOM setting information about the standby I/O module from the acquired IOM setting information about the control I/O module; and an IOM download section that downloads the generated IOM setting information into the second IOM setting information holding section of the standby I/O module.

(2) According to a second aspect of the invention, there is provided the redundant I/O module as in the first aspect, further including:

an IOM loading operation section that stores the IOM setting information about the control I/O module acquired by the IOM setting information acquisition section, that passes the IOM setting information to the IOM setting information generation section to request generation of IOM setting information about the standby I/O module, and that acquires and stores the generated IOM setting information about the standby I/O module, wherein the IOM download section makes a reference to the IOM setting information about the standby I/O module stored in the IOM loading operation section.

(3) According to a third aspect of the invention, there is provided the redundant I/O module as in the first or second aspect, wherein the controller forms a distributed control system that controls plant equipment and that communicates with an operation monitoring device by way of a control bus.

(4) According to a fourth aspect of the invention, there is provide the redundant I/O module as in the third aspect, wherein the IOM status generation section of the controller reports a status of replacement of the standby I/O module to the operation monitoring apparatus byway of the control bus.

DETAILED DESCRIPTION OF THE PREFERRED EMBODIMENTS

Figure 1:
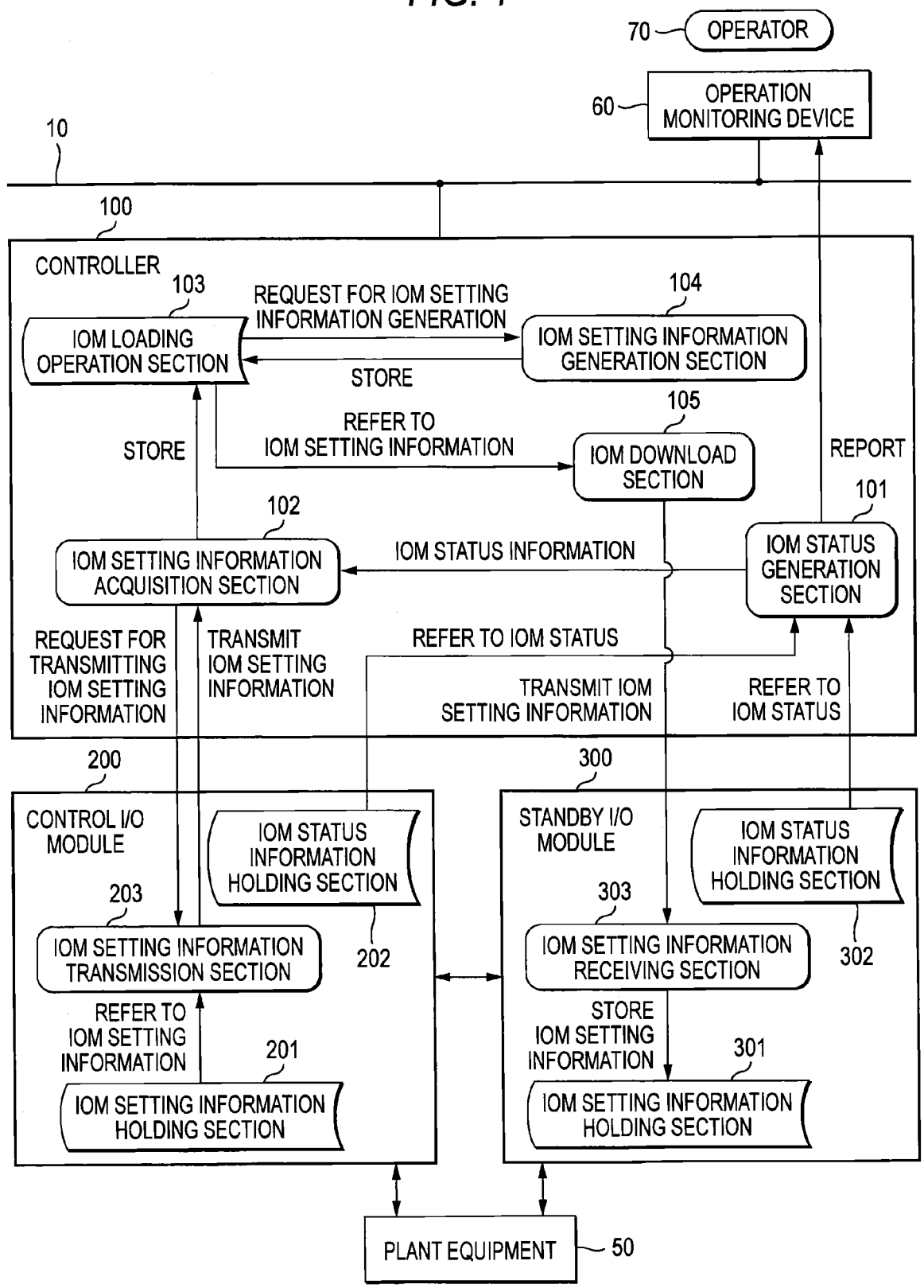
FIG. 1 is a functional block diagram of a distributed control system equipped with a redundant I/O module to which the present invention is applied.
Figure 2:
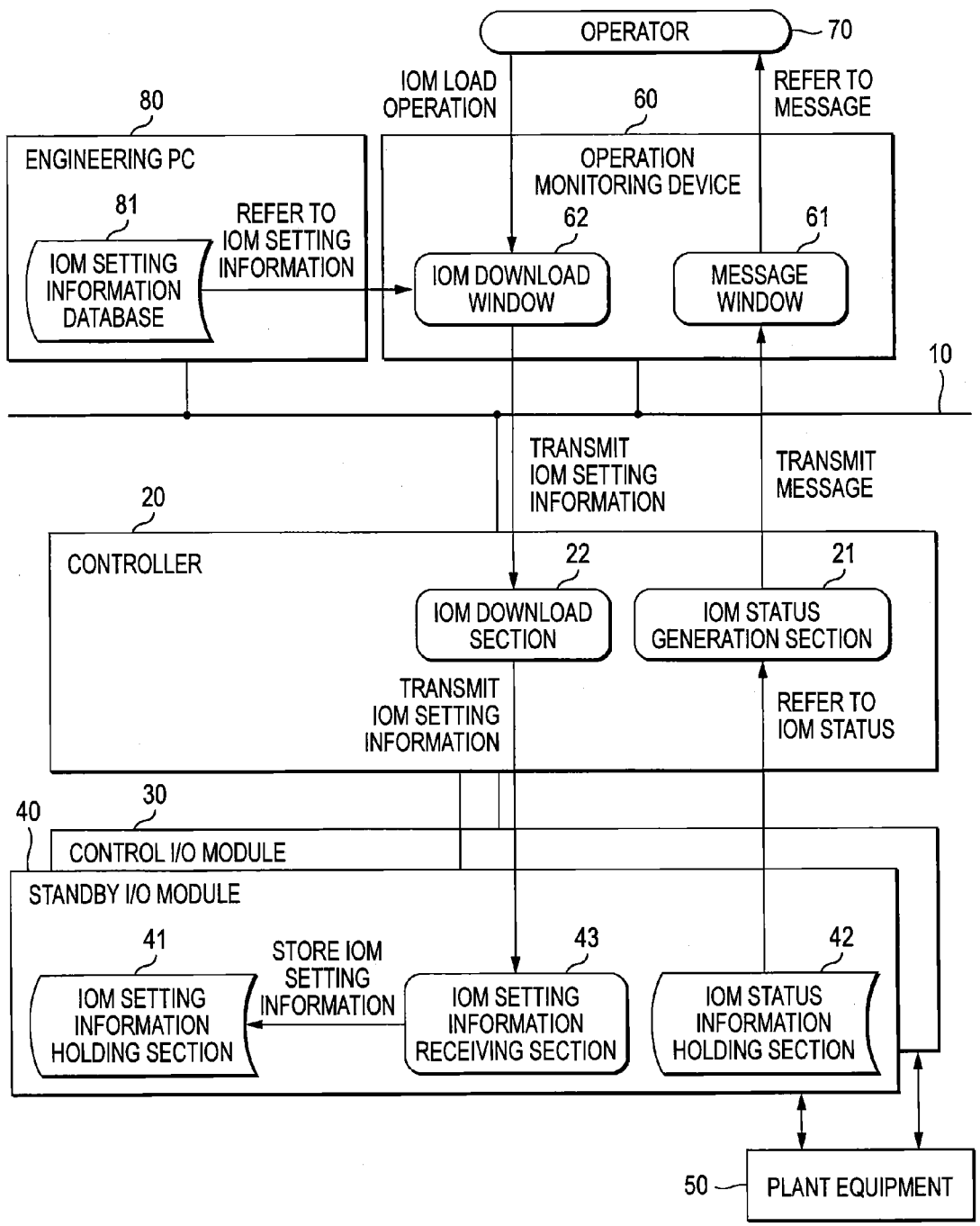
FIG. 2 is a functional block diagram for describing a related-art IOM setting information download technique of a distributed control system.

The present invention is hereunder described in more detail by reference to the drawings. FIG. 1 is a functional block diagram of a distributed control system equipped with a redundant I/O module to which the present invention is applied. Elements which are identical with those of the related-art system described by reference to FIG. 2 are assigned the same reference numerals, and their repeated explanations are omitted.

A controller 100 to which the present invention is applied is connected to the control bus 10, and plant equipment 50 is controlled by way of a redundant control I/O module 200 or a standby I/O module 300.

The control I/O module 200 is equipped with the IOM setting information holding section 201 and the IOM status holding section 202, and the standby I/O module 300 is equipped with the IOM setting information holding section 301 and the IOM status holding section 302. The control I/O module 200 is also equipped with the IOM setting information transmission section 203, and the standby I/O module 300 is equipped with the IOM setting information receiving section 303.

In the controller 100, when ascertained a replaced status of the standby I/O module 300 and a normal status of the control I/O module 200 by reference to the IOM status holding section 302 of the standby I/O module 300 and the IOM status information holding section 202 of the control I/O module 200, the IOM status generation section 101 transmits information about the statuses to the IOM setting information acquisition section 102.

Although the information about statuses is reported to the operation monitoring device 60 as well, the operator 70 does not need IOM loading operation, and the controller 100 automatically carries out IOM load processing.

The IOM setting information acquisition section 102 received the report sends a request for transmitting IOM setting information to the IOM setting information transmission section 203 of the control I/O module 200. The IOM setting information transmission section 203 acquires IOM setting information about the control I/O module by reference to the IOM setting information holding section 201 and transmits the thus-acquired IOM setting information to the IOM setting information acquisition section 102 of the controller 100.

The IOM setting information acquisition section 102 stores the IOM setting information uploaded from the control I/O module 200 into the IOM loading operation section 103. Stored IOM setting information is passed to the IOM setting information generation section 104.

The IOM setting information generation section 104 checks soundness of the uploaded IOM setting information about the control I/O module, generates IOM setting information provided with IOM attribute information about the standby I/O module, and stores the thus-generated IOM setting information into the IOM loading operation section 103.

The IOM download section 105 fetches the stored IOM setting information about the standby I/O module by reference to the IOM loading operation section 103 and transmits the thus-acquired information to the IOM setting information receiving section 303 of the standby I/O module 300.

The IOM setting information receiving section 303 stores the received IOM setting information into the IOM setting information holding section 301. By means of storage of information, the standby I/O module 300 starts I/O operation in accordance with new IOM setting information.

As mentioned above, according to the present invention, IOM setting information is uploaded from the control I/O module whose controller is in normal operation at the time of replacement of the standby I/O module, and the information is automatically loaded into the standby I/O module.

In the plant, a maintenance engineer and an operator play different roles in many occasions, and a necessity for operator's operation when the maintenance engineer replaces an I/O module may pose problems of operations of both the maintenance engineer and the operator.

The mechanism of the present invention obviates a necessity for operator's operation and an engineering PC during IOM load processing. Consequently, only a maintenance engineer can perform operations from replacement of a broken-down standby I/O module to commencement of I/O operation, which can contribute to enhancement of efficiency of replacement maintenance operation.

What is claimed is:

1. A redundant I/O module that communicates with a controller, by which plant equipment is controlled via either a control I/O module or a standby I/O module, comprising:

the control I/O module that communicates with the controller includes a first IOM setting information holding section for storing IOM setting information downloaded from a high-level apparatus, and the standby I/O module that communicates with the controller includes a second IOM setting information holding section for storing IOM setting information downloaded from the high-level apparatus, wherein the controller comprises:

an IOM status generation section that refers to a status of the first IOM setting information holding section of the control I/O module and a status of the second IOM setting information holding section of the standby I/O module;

an IOM setting information acquisition section that makes an access to the first IOM setting information holding section of the control I/O module to acquire IOM setting information about the control I/O module when status information from the IOM status generation section indicates a status of replacement of the standby I/O module and a normal status of the control I/O module;

an IOM setting information generation section that generates IOM setting information about the standby I/O module from the acquired IOM setting information about the control I/O module; and an IOM download section that downloads the generated IOM setting information into the second IOM setting information holding section of the standby I/O module.

2. The redundant I/O module as in claim 1, further comprising:

an IOM loading operation section that stores the IOM setting information about the control I/O module acquired by the IOM setting information acquisition section, that passes the IOM setting information to the IOM setting information generation section to request generation of IOM setting information about the standby I/O module, and that acquires and stores the generated IOM setting information about the standby I/O module, wherein the IOM download section makes a reference to the IOM setting information about the standby I/O module stored in the IOM loading operation section.

3. The redundant I/O module as in claim 1, wherein the controller forms a distributed control system that controls plant equipment and that communicates with an operation monitoring device by way of a control bus.

4. The redundant I/O module as in claim 3, wherein the IOM status generation section of the controller reports the status of replacement of the standby I/O module to the operation monitoring apparatus by way of the control bus.

* * * * *